(12) United States Patent
Lindqvist et al.

(10) Patent No.: US 7,258,393 B2
(45) Date of Patent: Aug. 21, 2007

(54) CAB SUPPORT

(75) Inventors: Anders Lindqvist, Askersund (SE); Ulf Granar, Bramhult (SE); Jonny Lindblom, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/279,099

(22) Filed: Apr. 8, 2006

(65) Prior Publication Data

US 2006/0162975 A1 Jul. 27, 2006

Related U.S. Application Data

(63) Continuation of application No. PCT/SE04/01630, filed on Nov. 9, 2004.

(30) Foreign Application Priority Data

Nov. 10, 2003 (SE) .................................. 0302992

(51) Int. Cl.
*B60J 7/00* (2006.01)
(52) U.S. Cl. ................................................ 296/190.03
(58) Field of Classification Search .......... 296/190.03, 296/35.1, 190.07, 100.09; 180/89.14, 89.13
See application file for complete search history.

(56) References Cited

U.S. PATENT DOCUMENTS

| 3,768,856 | A | * | 10/1973 | Stuller .................... 296/190.03 |
| 5,392,936 | A | * | 2/1995 | Solomon et al. ........... 296/95.1 |
| 5,399,059 | A | * | 3/1995 | Simpson ..................... 414/635 |
| 5,520,500 | A | * | 5/1996 | McIlwain et al. ......... 180/89.19 |
| 5,743,698 | A | * | 4/1998 | Smith et al. ................. 414/408 |
| 6,171,050 | B1 | * | 1/2001 | Johnson ..................... 414/685 |
| 6,173,973 | B1 | * | 1/2001 | Robinson ..................... 180/41 |
| 6,276,750 | B1 | * | 8/2001 | Frisch .................... 296/190.03 |
| 6,322,133 | B1 | * | 11/2001 | Yantek et al. .......... 296/190.03 |
| 6,325,449 | B1 | * | 12/2001 | Sorensen et al. ........... 52/735.1 |
| 6,354,788 | B1 | * | 3/2002 | Adams ......................... 296/56 |
| 6,543,563 | B1 | * | 4/2003 | Muraro ..................... 180/89.14 |
| 6,568,746 | B2 | * | 5/2003 | Komatsu et al. ........ 296/190.08 |
| 6,846,036 | B2 | * | 1/2005 | Stone ..................... 296/190.01 |
| 7,156,474 | B2 | * | 1/2007 | Safe et al. ................... 305/199 |
| 2005/0000121 | A1 | * | 1/2005 | Mori ............................. 37/347 |
| 2006/0158006 | A1 | * | 7/2006 | Mori ..................... 296/190.03 |
| 2006/0249986 | A1 | * | 11/2006 | Yoon ..................... 296/190.03 |

FOREIGN PATENT DOCUMENTS

| JP | 2000229548 A | 8/2000 |
| JP | 2002046657 A | 2/2002 |

OTHER PUBLICATIONS

International Search Report from corresponding International Application PCT/SE2004/001630.

* cited by examiner

*Primary Examiner*—Kiran B. Patel
(74) *Attorney, Agent, or Firm*—WRB-IP LLP

(57) ABSTRACT

A working machine includes a frame, a cab arranged on the frame, and a lateral support arranged between the frame and the cab for taking up load from the cab to the frame when lateral displacement of the cab takes place in a direction toward the side on which the lateral support is arranged to allow an initial lateral displacement of the cab before its function of taking up load is activated.

17 Claims, 2 Drawing Sheets

CAB SUPPORT

BACKGROUND AND SUMMARY

The present application is a continuation of International Application No. PCT/SE2004/001630, filed Nov. 9, 2004, designating the U.S., and claiming priority to SE 0302992-3, filed Nov. 10, 2003, both of which are incorporated by reference.

The present invention relates to a working machine, comprising a frame, a cab arranged on the frame, and a lateral support means arranged between the frame and the cab for taking up load from the cab to the frame when lateral displacement of the cab takes place in a direction toward the side on which the lateral support means is arranged.

The working machine can be any type of working machine which comprises a cab. In particular, a type of machine is intended where the cab is spring-mounted on the frame, as is typical of excavating machines. For the purpose of exemplification, the invention will therefore be described with reference to an excavating machine of such a kind.

The invention relates in particular to a working machine in which the cab is laterally mounted on the frame and forms the structural part which, in the event of the machine overturning in one lateral direction at least, will be directly subjected to considerable lateral forces.

During normal operation, cabs of excavating machines are not subjected to any appreciable lateral forces. It does happen, however, that excavating machines, for example in connection with excavating on steeply sloping ground, are subjected to such great lateral forces that they overturn in the lateral direction.

Such excavating machines usually comprise an arm extending from the frame for controlling the actual implement, the bucket. The arm is mounted alongside the cab and is, together with the cab, arranged rotatably or at least pivotably in the horizontal plane of the machine. In other words, it is always located at the side of the cab.

If tipping or overturning takes place in the direction toward the arm, the arm will take up a large part of the lateral forces to which it is subjected on impact with the ground. The cab can come to rest with its dead weight against the arm and possibly also to some extent against the ground but will not in normal cases be subjected to particularly great lateral forces in the event of overturning in this direction.

If the machine overturns in the direction where no arm protects the cab from lateral forces, great lateral forces will be applied to the cab. Modern cab constructions are not always sufficiently strong to take up such large forces as may be involved, at least in the case of larger excavating machines.

One way of solving the problems referred to above is described in JP 2002-46657. This document discloses a reinforcement construction or a protective construction on a vehicle which, to judge from the abstract and the drawing, is a dumper, excavating machine or the like.

The cab is laterally located, that is to say offset relative to the center axis of the vehicle. A stay is fixed between the frame and the cab, probably for taking up lateral forces between the cab and the frame.

One disadvantage of the construction disclosed in JP 2002-46657, however, is that the stay is apparently rigidly connected to on the one hand the frame and on the other hand the cab. It is not clear whether the cab in JP 2002-46657 is spring-mounted. If that were the case, the stay construction shown would have a marked detrimental effect on the mounting of the cab and the comfort the driver would enjoy during operation.

Vibrations and shaking which normally occur in the frame and the chassis would be transmitted to the cab via the stay.

It is desirable to provide a working machine of the kind referred to in the introduction which is constructed in such a way that its cab is relieved in the event of overturning. In other words, the working machine is to be provided with a support construction for taking up the lateral forces to which the cab is subjected in connection with overturning in at least one of two lateral directions.

The support construction is moreover to allow spring-mounting of the cab during normal operation, that is to say it is not to transmit vibrations and shaking from the frame or the chassis to the cab.

According to an aspect of the present invention, a working machine comprises lateral support means arranged to allow an initial lateral displacement of the cab before its function of taking up load is activated. If the cab is laterally located, that is to say offset from the center line of the working machine, the lateral support means is advantageously located on that side of the cab nearest to said center line.

According to an aspect of the invention, the lateral support means is arranged directly in front of a beam of the cab so as, when lateral displacement takes place, to bear against and take up load directly via said beam. The beam is preferably a vertical beam of the cab or a horizontal beam of the cab. It is also conceivable for the lateral support means to be arranged directly in front of both a vertical beam and a horizontal beam, suitably located at the upper edge of the cab or at the lower edge of a side window. In a preferred embodiment, the vertical beam is a front beam, but it would for that matter be conceivable for the lateral support means to be arranged directly in front of a rear vertical beam.

However, these beams can often be made relatively strong without having any appreciable detrimental effect on the field of vision of the driver. In a normal case, therefore, the rear vertical beam is considerably stronger, that is to say it has a greater capacity for taking up load, than the front vertical beam, which in turn results in it being the front vertical beam which has to be reinforced by way of the lateral support means in order to avoid the front beam giving way and the front portion of the cab collapsing.

Generally, the lateral support means should be arranged directly in front of that part of the cab, or the beam, which runs the greatest risk of collapsing in the event of overturning as described above. This is normally the weakest of a number of beams which are present.

The lateral support means is suitably anchored to the frame. According to an aspect of the invention, the working machine comprises an arm mounted in the frame at the side of the cab, the lateral support means advantageously being anchored to the arm. The arm is a swiveling arm for controlling and maneuvring an implement, typically a bucket or the like.

The lateral support means is advantageously arranged with a free clearance between itself and the cab. The clearance should be greater than the expected lateral movements of the cab during normal operation in the region of the lateral support means. According to an aspect of the invention, however, the lateral support means is spring-anchored to the cab.

The spring action should be so gentle that vibrations and shaking from the frame or the chassis during normal operation are not transmitted to the cab via the lateral support means. Alternatively, the lateral support means can be fixed to the cab and have a clearance toward the frame so as, when the cab is displaced in the lateral direction, to be supported against the frame or a part connected thereto, such as the arm of an excavating machine.

The lateral support means is suitably dimensioned to be deformed while it takes up load from the cab to the frame and thus allow limited continued lateral displacement of the cab. The deformation can be only elastic or elastic which changes to plastic. The deformation is to be such that it counteracts early collapse of the cab in the event of overturning. The lateral support means can be said to form a deformation zone for the cab.

BRIEF DESCRIPTION OF FIGURES

For the purpose of exemplification, the invention will be described below with reference to the accompanying drawings, in which.

DETAILED DESCRIPTION

Figure 1:
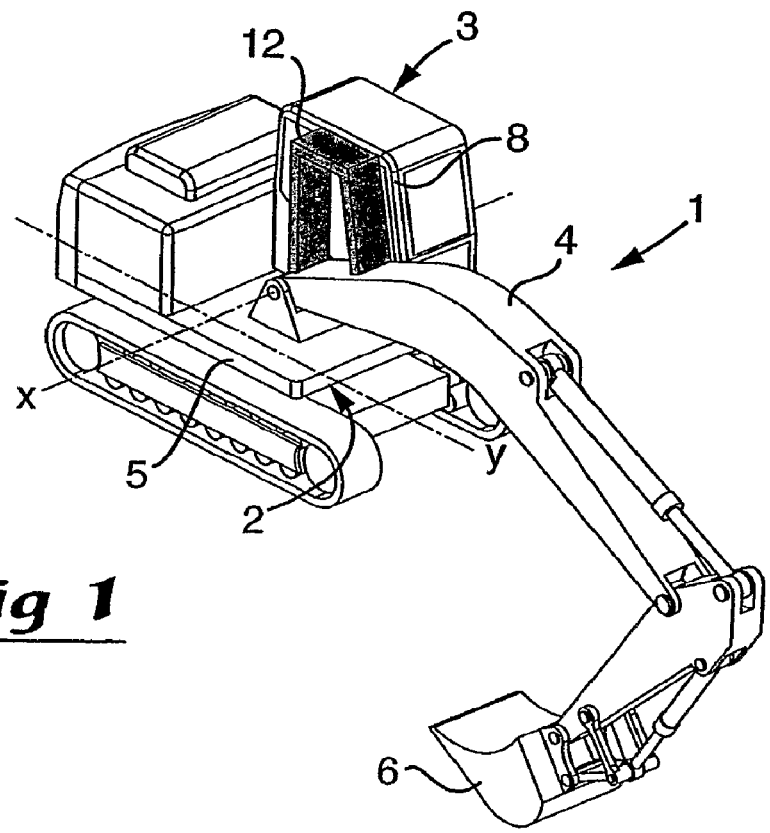
FIG. 1 is a perspective illustration of a working machine provided with a lateral support means according to the invention.

FIG. 1 shows a working machine 1, in this case an excavating machine, with a supporting frame 2, a cab 3 and an arm 4. The cab 3 and the arm 4 are arranged on the frame 2. They are arranged rotatably or swivelably relative to part of the frame 2 insofar as they are arranged on a common base 5 which, forms part of the frame 2 and is arranged rotatably in the horizontal plane of the working machine 1. The arm 4 is moreover mounted pivotably about a horizontal axis x and is connected at its end to an implement 6, in this case a bucket.

The cab 3 contains an operating position, from which the working machine 1 is controlled by a driver. The cab 3 is spring-mounted on the frame 2 via spring elements, in this case rubber elements 7, which are arranged under the cab 3 and are supported against the base 5. The cab 3 is also located laterally relative to a longitudinal center line y through the working machine 1 or, to be precise, through the base 5. The cab 3 comprises front vertical pillars or beams 8, rear vertical pillars or beams 9 and upper horizontal beams 10, which connect the front pillars 8 to the rear pillars 9. Further members are conceivable, for example intermediate horizontal beams in the region of the lower edge of a side window. Here, the rear pillars 9 are stronger and have a greater capacity for taking up load or bending strength than the front pillars 8. The side surfaces of the cab 3 are formed by windows 11 made of glass or plastic, and sheet metal.

Figure 2:
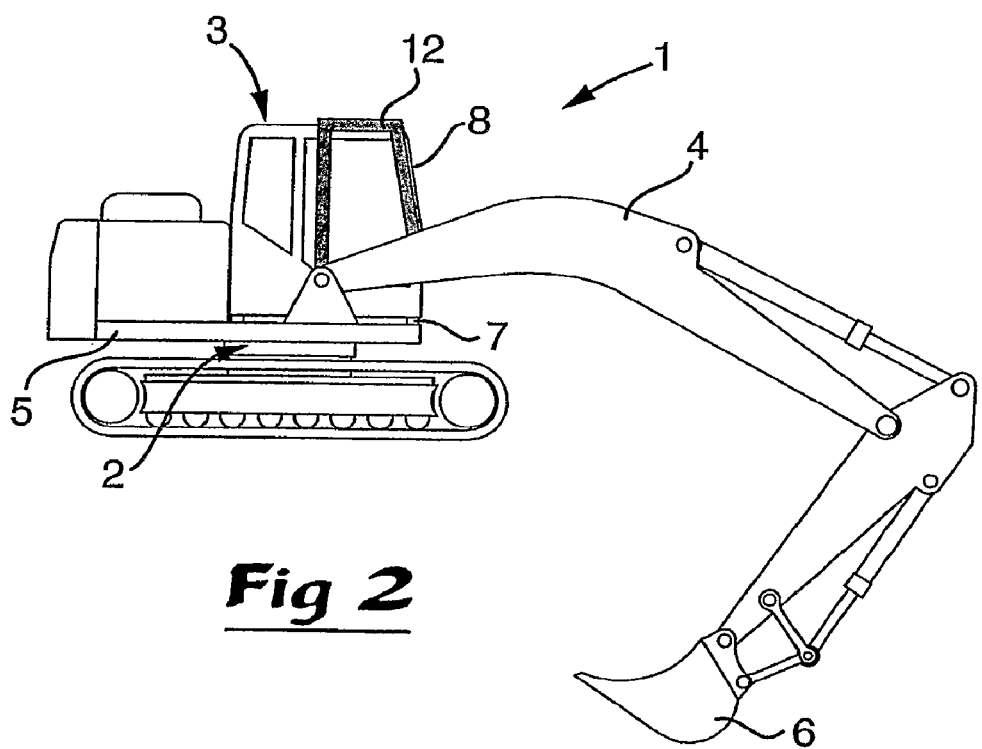
FIG. 2 is a view from the side of part of the working machine according to a first illustrative embodiment.

According to a first illustrative embodiment, which is shown in greater detail in FIG. 2, the working machine 1 comprises a lateral support means 12 on that side of the cab 3 which is located nearest to said center line y or nearest to the arm 4. The purpose of the lateral support means 12 is to form a support for the cab 3 in the direction of the center line y or of the arm 4 in the event that the cab 3 should be subjected to a great force from the side to which it is offset, for example in connection with overturning in such a direction. The lateral support means 12 is suitably a beam or the like which has a first point or surface of application against the frame 2, in this case the arm 4, and a second point or surface of application against the cab 3. The lateral support means 12 is to be arranged in such a way that it allows the cab movements which the spring elements 7 allow during normal operation in the absence of exceptional lateral forces on the cab 3. To this end, the lateral support means 12 can be anchored either to only the cab 3 or to only the frame 2/the arm 4, with a free clearance to the part to which it is not anchored, the clearance being of such a size that it guarantees said cab movements, or at least of such a size that vibrations and shaking are not transmitted from the frame 2/the arm 4 via the lateral support means 12 to the cab 3 during normal operation.

Alternatively, the lateral support means 12 can be anchored to both the cab 3 and the frame 2/the arm 4, but on condition that at least one of the anchorings is designed with spring action, so that an initial displacement of the cab 3 in the load take-up direction of the lateral support means 12 is permitted before the spring action "bottoms" and the lateral support means 12 takes up load fully. The spring system must moreover be so gentle that essentially no vibrations are transmitted from the frame 2/the arm 4 to the cab 3 via it. It is also possible to arrange some form of damper as a replacement for or complement to such a spring system. It is also possible for the lateral support means 12 to comprise a number of parts which are limitedly displaceable in relation to one another in the load take-up direction so as to allow the initial displacement of the cab 3 before the relative displaceability ceases and said parts "bottom" relative to one another and their fixing points to the frame 2/the arm 4 and/or the cab 3.

According to a first illustrative embodiment, shown in FIG. 2, the lateral support means 12 comprises a beam which at one of its ends is anchored to the arm 4 and extends essentially parallel to the front vertical pillar 8. The pillar 8 does not have to be, and normally is not, absolutely vertical, and it will be understood that the beam 12 is arranged in such a way that it extends parallel along the pillar 8 for a case where the arm 4 is pivoted into a lower, essentially horizontal position in which it is extended to its maximum and the implement rests on the ground, that is to say in line with or on a level with the wheels or tracks of the working machine. The lateral support means 12 has the shape of an arch which is anchored at its opposite ends to the arm 4. The lateral support means 12 extends parallel to and along the front pillar 8, then parallel to and along part of the length of the upper member 10 and back down from the upper member 10 toward the arm 4. The lateral support means 12 extends at a distance, a clearance, from the cab 3. As mentioned above, however, some form of anchoring or contact between the lateral support means 12 and the cab 3 is possible, provided that this does not lead to vibrations and shaking being transmitted to the cab via the lateral support means 12.

Figure 3:
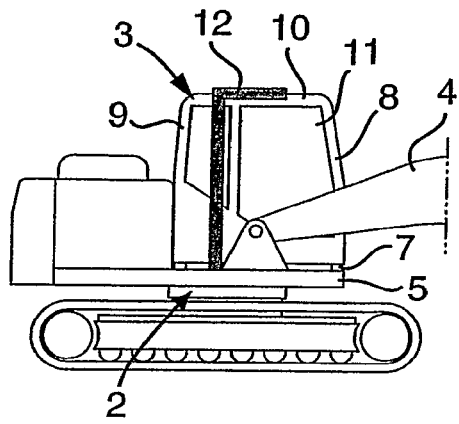
FIG. 3 is a view from the side of a second illustrative embodiment.

FIG. 3 shows a second illustrative embodiment, according to which the lateral support means 12 is anchored to the chassis of the working machine or, to be precise, to the base 5, and extends up to the upper member 10 of the cab in the same way as in the other illustrative embodiment. This solution is entirely possible if there is sufficient space for the lateral support means 12 between the arm 4 and the cab 3.

Figure 4:
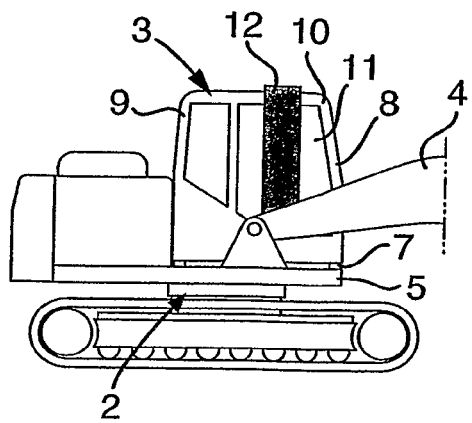
FIG. 4 is a view from the side of a third illustrative embodiment.

According to a third illustrative embodiment, which is shown in FIG. 4, the lateral support means 12 comprises a beam which is connected at one of its ends to the arm 4 and extends up to the upper member 10 so as to bear against and take up load from the upper member 10 in the event of overturning or the like. Said beam can be connected to or supplemented by a further beam which extends parallel to the upper member 10, preferably along a front part of it.

Figure 5:
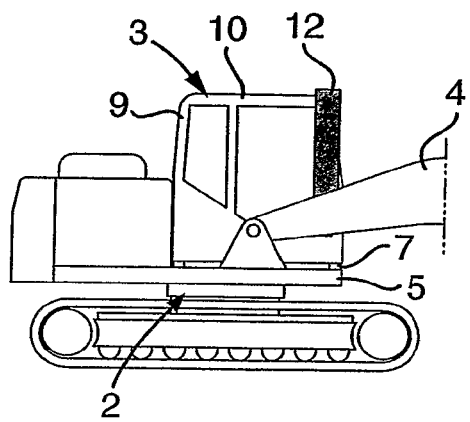
FIG. 5 is a view from the side of a fourth illustrative embodiment.

FIG. 5 shows an alternative illustrative embodiment where the lateral support means 12 extends from the arm 4 essentially parallel to only the front vertical pillar 8.

Figure 6:
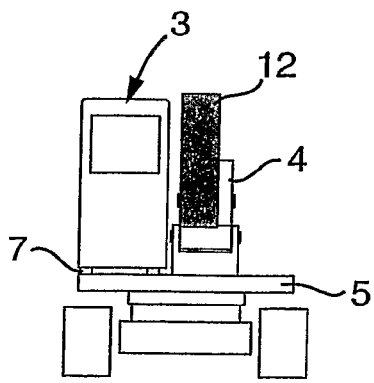
FIG. 6 is a view from the rear of any one of the first, third or fourth illustrative embodiments.
Figure 7:
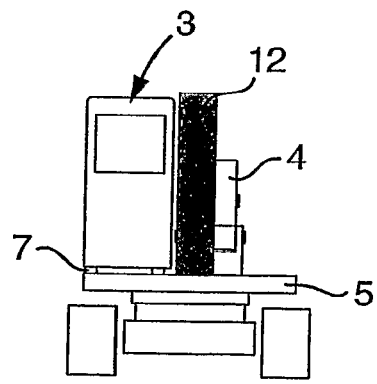
FIG. 7 is a view from the rear of the second illustrative embodiment.

FIGS. 6 and 7 show views from the rear of different embodiments, on the one hand when the lateral support means 12 is fixed directly to the base 5, and on the other hand when it is fixed to the arm 4. The distance between the lateral support means 12 and the cab 3 has been shown as smaller in FIG. 6 than in FIG. 7, mainly for the purpose of exemplification.

It will be understood that variants of the invention will be obvious to an expert in the field without departing from the scope of the invention such as it is defined in the accompanying patent claims supported by the description and the accompanying drawings.

In particular, it will be understood that widely differing geometries of the lateral support means 12 are included within the scope of the invention and that the lateral support means 12 can be anchored in different ways to the cab 3 and/or the frame 2/the base 5/the arm 4.

It will also be understood that "vertical" pillar or beam 8,9 does not necessarily mean one which is absolutely vertical, but that considerable deviations from absolute verticality are possible within the scope of the invention. The same is true for the term "horizontal" upper member or beam 10. The extension of the upper member 10 does not by any means have to be absolutely horizontal. The upper member forms an upper stay between the front and rear pillars 8,9. An arch-like pillar construction of the cab 3 is also entirely possible, where there are no clear transitions between vertical and horizontal members but these merge with one another in gently rounded portions and can even be formed by one and the same beam which has been bent or provided with an arch shape in another suitable way.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention claimed is:

1. A working machine, comprising: a frame; a cab arranged on the frame; and a support arranged between the frame and a side of the cab for taking up load from the cab to the frame when displacement of the cab takes place in a direction toward the side on which the support is arranged, wherein the support is arranged relative to the cab to allow an initial displacement of the cab over a gap before its function of taking up load is activated.

2. The working machine as claimed in claim 1, wherein the support is arranged directly aligned with a beam of the cab so that after the initial displacement the support bears against and is loaded directly via the beam.

3. The working machine as claimed in claim 2, wherein the beam is a horizontal beam of the cab.

4. The working machine as claimed in claim 2, wherein the beam is a vertical beam of the cab.

5. The working machine as claimed in claim 4, wherein the beam is a horizontal beam of the cab.

6. The working machine as claimed in claim 5, wherein the support is anchored to the frame.

7. The working machine as claimed in claim 6, comprising an arm mounted in the frame at the side of the cab, and wherein the support is anchored to the arm.

8. The working machine as claimed in claim 7, wherein the support is arranged with a free clearance between itself and the cab.

9. The working machine as claimed in claim 7, wherein the support is spring-anchored to the cab.

10. The working machine as claimed in claim 9, wherein the support comprises a plurality of parts which are limitedly displaceable in relation to one another in the load take-up direction so as to allow the initial displacement of the cab.

11. The working machine as claimed in claim 10, wherein the support is adapted to be deformed while it takes up load from the cab to the frame and thus allow limited continued displacement of the cab.

12. The working machine as claimed in claim 1, wherein the support is anchored to the frame.

13. The working machine as claimed in claim 1, comprising an arm mounted to the frame at the side of the cab, and wherein the support is anchored to the arm.

14. The working machine as claimed in claim 1, wherein the support is arranged with a free clearance between itself and the cab.

15. The working machine as claimed in claim 1, wherein the support is spring-anchored to the cab.

16. The working machine as claimed in claim 1, wherein the support comprises a plurality of parts which are limitedly displaceable in relation to one another in the load take-up direction so as to allow the initial displacement of the cab.

17. The working machine as claimed in claim 1, wherein the support is dimensioned to be deformed while it takes up load from the cab to the frame and thus allow limited continued displacement of the cab.

* * * * *